Figure 1:
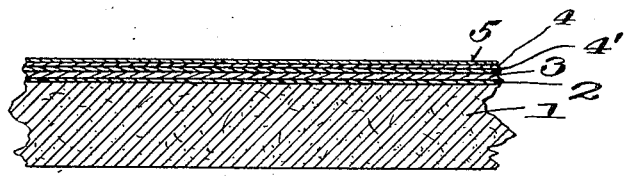

Feb. 24, 1931.                J. T. BALDWIN                1,793,666
           FLOOR COVERING AND PROCESS OF MAKING THE SAME
                     Original Filed Oct. 29, 1926

Julian T. Baldwin, Inventor

By Prentiss, Stone & Boyden
                                        Attorney

Patented Feb. 24, 1931

1,793,666

UNITED STATES PATENT OFFICE

JULIAN T. BALDWIN, OF WEST CHESTER, PENNSYLVANIA, ASSIGNOR TO SANDURA COMPANY, INC., OF PHILADELPHIA, PENNSYLVANIA, A CORPORATION OF NEW JERSEY

FLOOR COVERING AND PROCESS OF MAKING THE SAME

Application filed October 29, 1926, Serial No. 145,001. Renewed May 17, 1930.

This invention relates to an improvement in smooth-surfaced floor coverings and to a process of making the same.

The floor covering of the present invention consists of a supporting base of linoleum or felt upon which is mounted a thin fibrous sheet material coated with a composition possessing certain desirable properties such as flexibility, toughness, durability, smoothness, and a high resistance to alkalies and soaps used for cleaning purposes.

The thin sheet material which may be kraft paper, or other suitable paper, or cloth, is made waterproof by impregnating the same with tung oil or pyroxylin. An initial coating of an inexpensive solid color paint is preferably applied to the waterproofed sheet to prevent saturation by the coating composition of this invention, which latter serves as the decorative or wear coat. The coated sheet may be attached to a linoleum or felt base by any suitable means. For instance, it may be cemented on by means of a composition of the nature set forth below.

The coating composition applied to the sheet material is described and claimed in my copending application Serial No. 138,897, filed October 1, 1926, and consists of resinous substances natural or synthetic, plasticizers, and if desired modifiers. Pigments or dyes of various kinds may be added to produce colored compositions to be used for decorative purposes, or they may be omitted, in which case the composition may be applied to a decorative layer and serves as a transparent wear coat.

In the use of a transparent wear coat over a resin-plasticizer composition, a novel feature is that the wear coat may be applied to the resin-plasticizer with a solvent similar to that employed in applying the resin-plasticizer composition. When this is done to an oil paint, the paint "lifts" or wrinkles, and becomes greatly distorted, especially if the paint isn't completely hardened. By using mutual solvents, the transparent coat and the paint coat are made homogeneous. Lifting will not take place, for one reason, because both coats dry at the same rate and to the same degree. A wear coat may be applied to the resin-plasticizer immediately after the paint coat is applied, while with oil paints such an application would either destroy the paint or prevent the oil in the paint from being oxidized as rapidly as if the transparent coat had not been applied, or both evils might result.

Examples of resinous substances employed are: acroides gum, rosin, Manila copal, shellac, cumar, ester gum and the like. Synthetic resins such as phenol-formaldehyde resins and urea resins may also be used.

It is to be understood that by resin is meant a true resin as techincally distinguished from a gum. A true resin, for instance, is insoluble in water, whereas a gum is soluble in water.

Plasticizers are substances or mixtures of substances which apparently form a permanent gel or state of solution with resinous substances. When a plasticizer is mixed with a resinous substance, the resulting composition is generally considered to be a solution of the resinous substance in the plasticizer, the plasticizer being the external phase. It is desirable in the present case to have the plasticizer as the internal phase or in solution in the resinous substance. The solution is probably not a true solution but a gel, or a dispersion of plasticizer in the resin.

Plasticizers are generally liquid and have practically no vapor pressure at ordinary temperatures (70° F.). They are sometimes spoken of as high boiling point solvents for resinous substances, their boiling points ranging not much below 300° C.; they are chemically stable; free from tackiness; and impart to the resinous substances the important properties of flexibility, toughness, impermeability, durability and smoothness of surface. Examples of plasticizers are; diethyl phthalate, dibutyl phthalate, diamyl phthalate, dibutyl tartrate, triphenyl phosphate, and tricresyl phosphate.

Modifiers are substances which impart such desirable properties as hardness, elasticity, and resistance to wear. They also serve as cheapeners and are used only optionally. Examples of modifiers are: waxes (such as Montan wax), rubber, fatty acids of vegetable oils, polymerized oils, drying oils, such as tung oil, and hydrocarbons such as spinacene and squalene.

The use of volatile solvents is optional, depending upon the manner of applying the coats. Examples of solvents are: ethyl alcohol preferably denatured, benzol, toluol, naphtha, and the like.

The following is a general formula for a decorative wear coat:

|  | Parts by weight |
|---|---|
| Resinous substances | 100 |
| Plasticizer | 35 |
| Modifier | 5–15 |
| Pigment | 100–200 |
| Solvent (if used) | 100 |

When a solvent is used, the composition may be applied by means of the regular flatbed or rotary printing machines or by hand-blocks in the same way that oil paints are usually applied. A solvent recovery system may be used to recover the solvents. The use of a solvent may be done away with by softening the composition by heat and using the above mentioned machines with heated metal printing blocks, heated rollers, heated paint carriages and troughs.

Examples of specific formulas used for decorative wear coats are as follows:

|  | Parts by weight |
|---|---|
| Ester gum | 100 |
| Dibutyl phthalate | 20 |
| Heavy bodied linseed oil | 15 |
| Pigments and fillers | 135 |

The above mixture is applied with heat as the flow producing agent. When used with solvent the following may be added:

|  | Parts by weight |
|---|---|
| Xylol | 50 |
| Solvent naphtha | 50 |

The amount of solvent used depends on the consistency desired. Altering the quantity of pigment and filler changes the consistency but also changes the properties of the coating.

The decorative layer, examples of which have been given, may be coated with a transparent wear coat such as a cellulose ester, or a resin-plasticizer composition of the nature to be set forth. On the other hand, a transparent wear coat comprising a resin and a plasticizer may be applied to a fibrous sheet material with or without a decorative coat. As stated before, in cases where one coating is applied to another, the best results are obtained where the coatings are resin-plasticizer compositions, or where the coatings contain mutual solvents.

A general formula for a transparent wear coat is as follows:

|  | Parts by weight |
|---|---|
| Resinous substances | 100 |
| Plasticizer | 30 |
| Modifier | 5 |
| Solvent (if used) | 200 |

This composition may be applied without the use of a solvent by softening by means of heat and by using in this case hot transfer rollers, or hot squeeze rollers. The liquid may be applied by means of transfer rollers, squeeze rollers, a spray, a brush or any other suitable means.

Two satisfactory formulas for transparent coatings are:

(1)

|  | Parts by weight |
|---|---|
| Bleached shellac | 100 |
| Dibutyl tartrate | 35 |
| 188 proof denatured ethyl alcohol | 100 |

The alcohol may be omitted and heat used to produce the necessary flow.

(2)

|  | Parts by weight |
|---|---|
| Cumar, light varnish grade | 50 |
| Ester gum | 50 |
| Diethyl phthalate | 25 |
| Rubber | 5 |
| Benzol | 100 |

The fibrous sheet to which the above coatings are applied, is dried at a relatively high temperature, above 145° F., if desired. Since no saturants are used which melt and discolor the decorative coat or render it tacky and slow drying as in the case of bitumen saturated felt, a higher temperature may be safely used. Owing to the thinness of the sheet and the higher temperature, the drying time is very much less than in the case of coated felt or linoleum bases. Air penetrates through the thin fibrous sheet, especially at high temperatures, and if it is not highly saturated, oxidation of the decorative layer may occur not only on the top surface but also from underneath, resulting in a product that is more resistant to wear than the product which is oxidized on the top surface only. The details of the foregoing coating on a sheet, particularly a thin sheet, are described and claimed in my copending application Serial No. 138,897, filed October 1, 1926.

The finished sheet just described is now mounted on a linoleum or felt base on either one or both sides. Heretofore, ordinarily where a decorative or wear layer is placed on both sides of the base, the coating must be put on one side and dried or baked, and another coating on the other side with a subsequent drying or baking. In this way the first coating will have received two bakings and render it brittle and reduce its wearing qualities. In the present process, however, since the decorative layer is dried independently of the base, each layer receives only one baking and the old objectionable dryness and brittleness are avoided.

Figure 2:
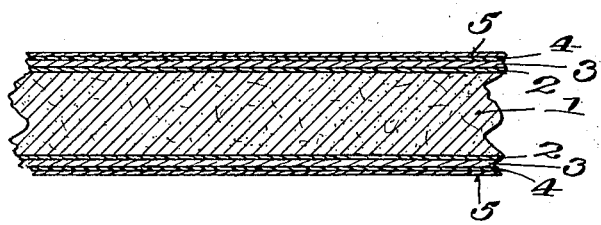

A diagrammatic representation of the finished floor covering is shown in the accompanying drawing which is enlarged about eight times. Fig. 1 shows a linoleum or felt base 1 to which is attached by means of a cementing layer 2, a thin sheet of paper 3 having a decorative coat 4 and a transparent wear coat 5. A layer of solid color paint 4' may be applied adjacent the paper 3 if desired. Fig. 2 shows both sides of a base 1 coated as in Fig. 1. Satisfactory results are obtained where the paper sheet 3 with its coatings is from 0.015 to 0.020 of an inch thick or where the thickness of the sheet and coatings is approximately twice the thickness of the coatings.

The product of this invention is sold as such. When the decorative coat on a linoleum or felt base floor covering has become obliterated, one needs to purchase merely the thin decorated sheet material described above and cement it to the old base. A fresh, new surface is thereby supplied, and the base will serve its purpose for a much longer time.

I claim:—

1. A floor covering consisting of a supporting base, a thin sheet material mounted on said base, and a composition consisting of a resin and a plasticizer for the gum, covering said sheet material.

2. A floor covering consisting of a supporting base, a thin paper sheet mounted on said base, and a composition consisting of a resin and a plasticizer for the gum, covering said paper sheet.

3. A floor covering consisting of a supporting base, a thin waterproofed paper sheet mounted on said base, and a composition consisting of a resin and a plasticizer for the resin, covering said waterproofed paper sheet.

4. A floor covering consisting of a supporting base, a thin sheet material mounted on at least one side of said base, and a composition including acroides gum and dibutyl tartrate, covering said sheet material.

5. A floor covering consisting of a supporting base, a thin paper sheet mounted on at least one side of said base, and a composition including acroides gum and dibutyl tartrate, covering said paper sheet.

6. A floor covering consisting of a supporting base, a thin waterproofed paper sheet mounted on at least one side of said base, and a composition including acroides gum and dibutyl tartrate, covering said waterproofed paper sheet.

7. A floor covering consisting of a supporting base, a thin sheet material mounted on said base, and a composition including a resin 100 parts by weight and a plasticizer for the resin 30 to 35 parts by weight, covering said sheet material.

8. A floor covering consisting of a supporting base, a thin sheet material mounted on said base, and a composition consisting of a resin, a plasticizer for the resin and a modifier, covering said sheet material.

9. A floor covering consisting of a supporting base, a thin sheet material mounted on said base, and a decorative coating on said sheet material, consisting of a resin, a plasticizer for the resin and pigments.

10. A floor covering consisting of a supporting base, a thin paper sheet mounted on said base, and a decorative coating on said paper sheet, consisting of a resin, a plasticizer for the resin and pigments.

11. A floor covering consisting of a supporting base, a thin paper sheet impregnated throughout with a waterproofing saturant and mounted on said base, and a decorative coating on said sheet material, consisting of a resin, a plasticizer for the resin and pigments.

12. A floor covering consisting of a supporting base, a thin sheet material mounted on said base, a decorative coating on said sheet material, and a transparent wear coating on said decorative coating, the said decorative coating consisting of a resin, a plasticizer for the resin and pigments.

13. A floor covering consisting of a supporting base, a thin sheet material mounted on said base, a decorative coating on said sheet material, and a transparent wear coating on said decorative coating, consisting of a resin and a plasticizer for the resin.

14. A floor covering consisting of a supporting base, a thin sheet material mounted on said base, a decorative coating on said sheet material and consisting of a resin, a plasticizer for the resin and pigments, and a transparent wear coating on said decorative coating and consisting of a resin and a plasticizer for the resin.

15. A process for making a floor covering which process consists in coating a thin fibrous sheet material with a composition including a resin and a plasticizer for the resin; and adhesively mounting the coated sheet on at least one side of a supporting base.

16. A process for making a floor covering which process consists in coating a thin fibrous sheet material with a composition including a resin, a plasticizer for the resin, and a volatile solvent; drying the coated sheet, and adhesively mounting the dried sheet on at least one side of a supporting base.

17. A process for making a floor covering which process consists in coating a thin paper sheet with a decorative layer of paint including a resin, a plasticizer for the resin and pigments; and adhesively mounting the coated sheet on at least one side of a supporting base.

18. A floor covering consisting of a supporting base, a thin sheet material mounted on said base, a decorative coating on said sheet material, and a transparent wear coating on said decorative coating, the said decorative coating consisting of a resin, a plasticizer for the resin, a modifier, and pigments.

19. A floor covering consisting of a supporting base, a thin sheet material mounted on said base, a decorative coating on said sheet material, and a transparent wear coating on said decorative coating, consisting of a resin, a plasticizer for the resin and a modifier.

20. A floor covering consisting of a supporting base, a thin sheet material, a layer of cementing material between the said base and the thin sheet material, and a composition consisting of a resin and a plasticizer for the resin, covering the said sheet material.

21. A floor covering consisting of a supporting base, a thin paper sheet mounted on the said base, a layer of coating paint on the said sheet, a decorative coating on the said layer of coating paint, the said decorative coating comprising a resin, a plasticizer for the resin, and pigments; and a transparent wear coating on the said decorative coating, the said transparent coating consisting of a resin and a plasticizer for the resin.

22. A floor covering consisting of a supporting base, a thin sheet material, a layer of a cementing material therebetween composed of a resin, a plasticizer for the resin, and a modifier, a decorative coat on said sheet, and a transparent wear coating on said decorative coating.

In testimony whereof I affix my signature.

JULIAN T. BALDWIN.